US012644471B2

(12) United States Patent
Nejedly et al.

(10) Patent No.: US 12,644,471 B2
(45) Date of Patent: Jun. 2, 2026

(54) ELECTRIC COMPRESSOR ASSEMBLY

(71) Applicant: Garrett Transportation I Inc., Torrance, CA (US)

(72) Inventors: Milan Nejedly, Brno (CZ); Vit Houst, Brno (CZ); Sanketh, Bangalore (IN)

(73) Assignee: Garrett Transportation I Inc., Torrance, CA (US)

( * ) Notice: Subject to any disclaimer, the term of this patent is extended or adjusted under 35 U.S.C. 154(b) by 73 days.

(21) Appl. No.: 18/648,416

(22) Filed: Apr. 28, 2024

(65) Prior Publication Data

US 2025/0334132 A1 Oct. 30, 2025

(51) Int. Cl.
*F04D 29/58* (2006.01)
*F02B 33/40* (2006.01)
*F04D 25/06* (2006.01)

(52) U.S. Cl.
CPC ............ *F04D 29/584* (2013.01); *F02B 33/40* (2013.01); *F04D 25/06* (2013.01)

(58) Field of Classification Search
CPC .... F04D 29/584; F04D 25/06; F04D 29/5853; F02B 33/40; F04B 53/08
USPC ....................................................... 417/423.8
See application file for complete search history.

(56) References Cited

U.S. PATENT DOCUMENTS

2013/0140923 A1* 6/2013 Kaiser .................... H02K 5/203 310/54
2023/0125199 A1* 4/2023 Iijima ................. F04D 29/5806 417/423.1

FOREIGN PATENT DOCUMENTS

JP 2007330075 A 12/2007
JP 2014236613 A 12/2014
WO WO-2021156039 A1 * 8/2021 ............... H02K 5/20

OTHER PUBLICATIONS

International Search Report and Written Opinion for PCT/US2025/011485, dated Apr. 10, 2025, in English, 13 pages.

* cited by examiner

*Primary Examiner* — Mark A Laurenzi
*Assistant Examiner* — Kelsey L Stanek
(74) *Attorney, Agent, or Firm* — BelayIP

(57) ABSTRACT

A compressor assembly (300) can include an electric motor (400) that includes a stator (420) and a rotor (440), where the stator defines an axis and where the rotor includes a shaft (460) substantially centered along the axis; a compressor wheel (500) coupled to the shaft; a back disk (600) disposed between the compressor wheel and the electric motor; a housing (700) that includes a bore wall (720) that seats the stator and an outer wall (740) that includes a coolant inlet (752) and a coolant outlet (754) in fluid communication with a coolant passage (760) defined by and at least in part between the bore wall and the outer wall; and at least one pin (810) disposed at least in part in the coolant passage, substantially parallel to the axis, that diminishes flow area within the coolant passage to define multiple flow paths within the coolant passage.

13 Claims, 13 Drawing Sheets

ELECTRIC COMPRESSOR ASSEMBLY

TECHNICAL FIELD

Subject matter disclosed herein relates generally to electric compressor assemblies that may be suitable for use with internal combustion engines.

BACKGROUND

An electric compressor assembly includes at least one compressor wheel rotatable by an electric motor. Such an assembly may be suitable for delivering compressed gas to an intake of an engine such as, for example, an internal combustion engine.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
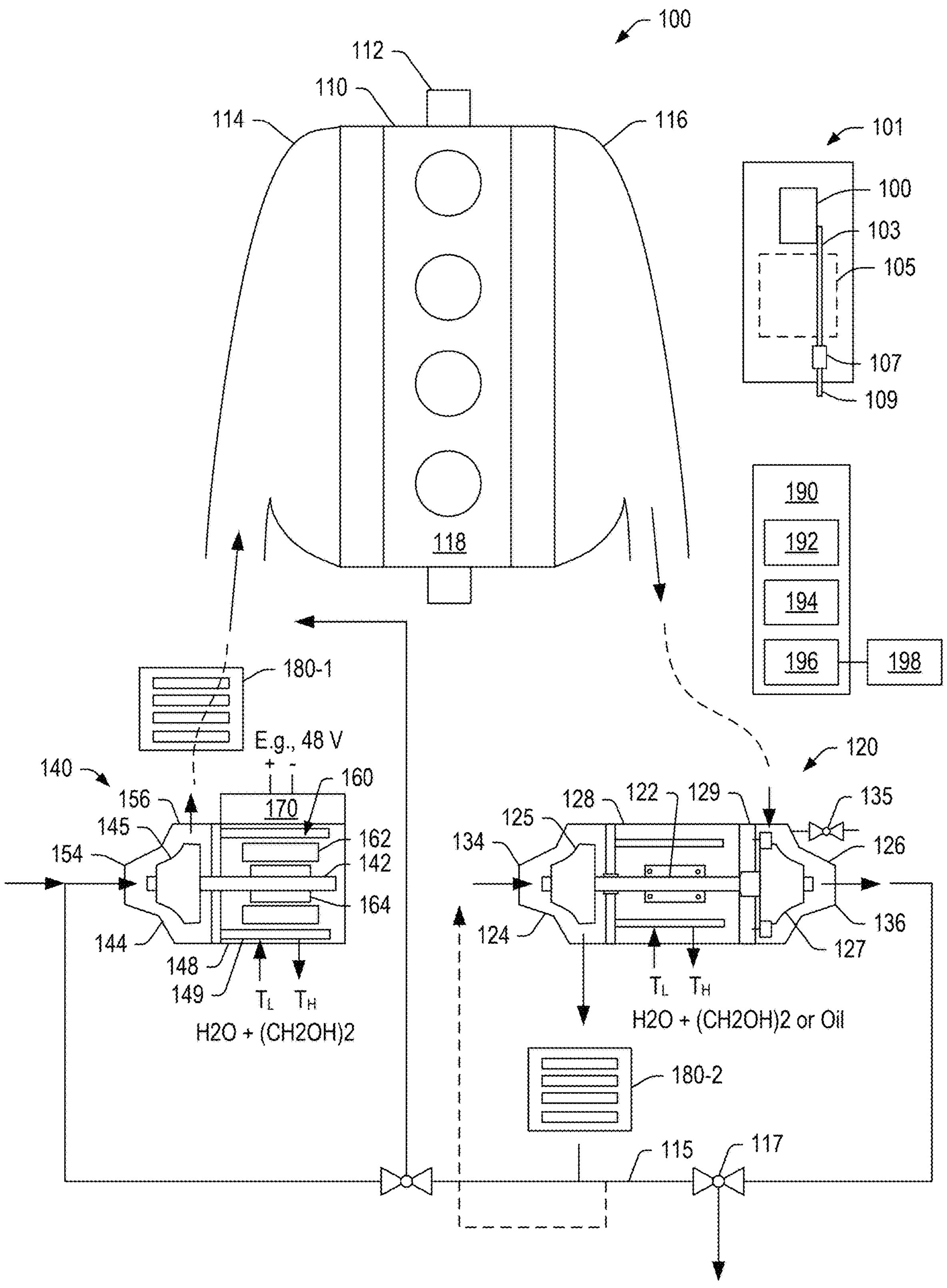
FIG. 1 is a diagram of an example of a system that includes an internal combustion engine and an electric compressor assembly.

Below, an example of a turbocharged engine system is described followed by various examples of components, assemblies, methods, etc.

One or more types of compressors may be utilized to increase output of an engine. For example, a compressor may be a compressor of a turbocharger driven by exhaust gas or may be a standalone compressor driven by an electric motor and referred to as an electric compressor. As an example, multiple compressors may be arranged in stages such as, for example, a first stage compressor may compress gas that may be delivered to an inlet of a second stage compressor. In such an example, the multiple compressors may be of a common type or of different types.

As an example, an electric compressor may be utilized for one or more purposes, which may include, for example, increased performance (e.g., power density, torque density, etc.), increased fuel economy (e.g., CO2 reduction, trip length, etc.), and/or improved emissions (e.g., catalyst light-off, diesel NOx, soot, etc.). As an example, a non-hybrid vehicle, a mild-hybrid vehicle, or a full-hybrid vehicle may be equipped with one or more compressors, which may include at least one electric compressor.

As an example, an electric compressor may be rated for rotational speed in excess of 50,000 rpm and for power output in excess of 3 KW. For example, consider an electric compressor rated to 90,000 rpm or more and 7.5 KW or more. As an example, an electric compressor may be energized for particular scenarios such as, for example, vehicle passing, which may reduce passing time, passing distance, etc., to reduce road risks.

As to types of electric motors to drive a compressor, they may operate using one or more voltages. For example, consider a 48 V electric motor, a 400 V electric motor, etc. As to types of control schemes, consider field oriented control (FOC) that may utilize a variable-frequency drive (VFD) control technique in which stator currents of a three-phase AC or brushless DC electric motor may be identified as two orthogonal components that can be visualized with a vector. In such an approach, one component can define magnetic flux and another component can define torque. As an example, pulse-width modulation (PWM) of a variable-frequency drive may define transistor switching according to stator voltage references that may be output of a proportional-integral (PI) current controller.

As an example, a controller may utilize one or more types of circuitry. For example, consider metal-oxide-semiconductor field-effect transistors (MOSFETs) and/or insulated-gate bipolar transistors (IGBTs). Such switching components may be packaged in a manner that facilitates dissipation of heat energy that results from internal losses.

As an example, an electric motor may be a permanent magnet synchronous motor (PMSM) that includes stator phase windings and rotor permanent magnets. A PMSM can include an air gap magnetic field provided by the permanent magnets that remains substantially constant. A PMSM can include armature coils at the stator that are commutated externally via external switching circuitry and a multiphase inverter topology (e.g., consider a three phase inverter topology). As an example, an FOC approach may be employed where, for example, multi-phase currents may be measured using external current shunt resistors available at the lower side of MOSFET switches of an inverter. As an example, a control scheme may provide for transmission of PWM signals to MOSFETs. As an example, one or more sensors may be employed. For example, consider one or more of encoders, resolvers, Hall sensors, etc.

Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.). As an example, a silencer such as a muffler may be included that aims to reduce sound emissions. As an example, a combined treatment unit and silencer may be utilized along an exhaust flow path or exhaust flow paths.

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In the turbocharger 120 of FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 (e.g., a variable nozzle turbine assembly) is shown as being, in part, disposed between the housing assembly 128 and the turbine housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream (see dashed line) and/or downstream the compressor wheel 125, for example, to a position upstream an electric compressor assembly 140.

In the example of FIG. 1, the electric compressor assembly 140 includes a shaft 142, a compressor housing assembly 144 that includes an inlet 154 and an outlet 156, a compressor wheel 145 coupled to the shaft 142, a housing 148 for an electric motor 160 where the housing 148 includes a coolant passage 149 and where the electric motor 160 includes a stator 162 and a rotor 164 where the shaft 142 is coupled to the rotor 164. As shown, a control circuity 170 can be supplied with electricity (e.g., 48 V, 400 V, etc.) to power the control circuitry 170 and the electric motor 160 where the control circuitry 170 can control operation of the electric motor 160 and hence rotation of the compressor wheel 145.

In the example of FIG. 1, the system 100 may include one or more intercoolers 180-1 and 180-2. As an example, an intercooler may provide for reducing heat energy in compressed gas, which may make the compressed gas more dense (e.g., consider PV=nRT where a reduction in temperature may reduce volume).

FIG. 1 also shows some examples of fluid that may be utilized for heat transfer. For example, a mixture of water and ethylene glycol may be utilized to transfer heat to and/or from the turbocharger 120 and/or the electric compressor assembly 140.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 and/or the electric compressor assembly 140 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
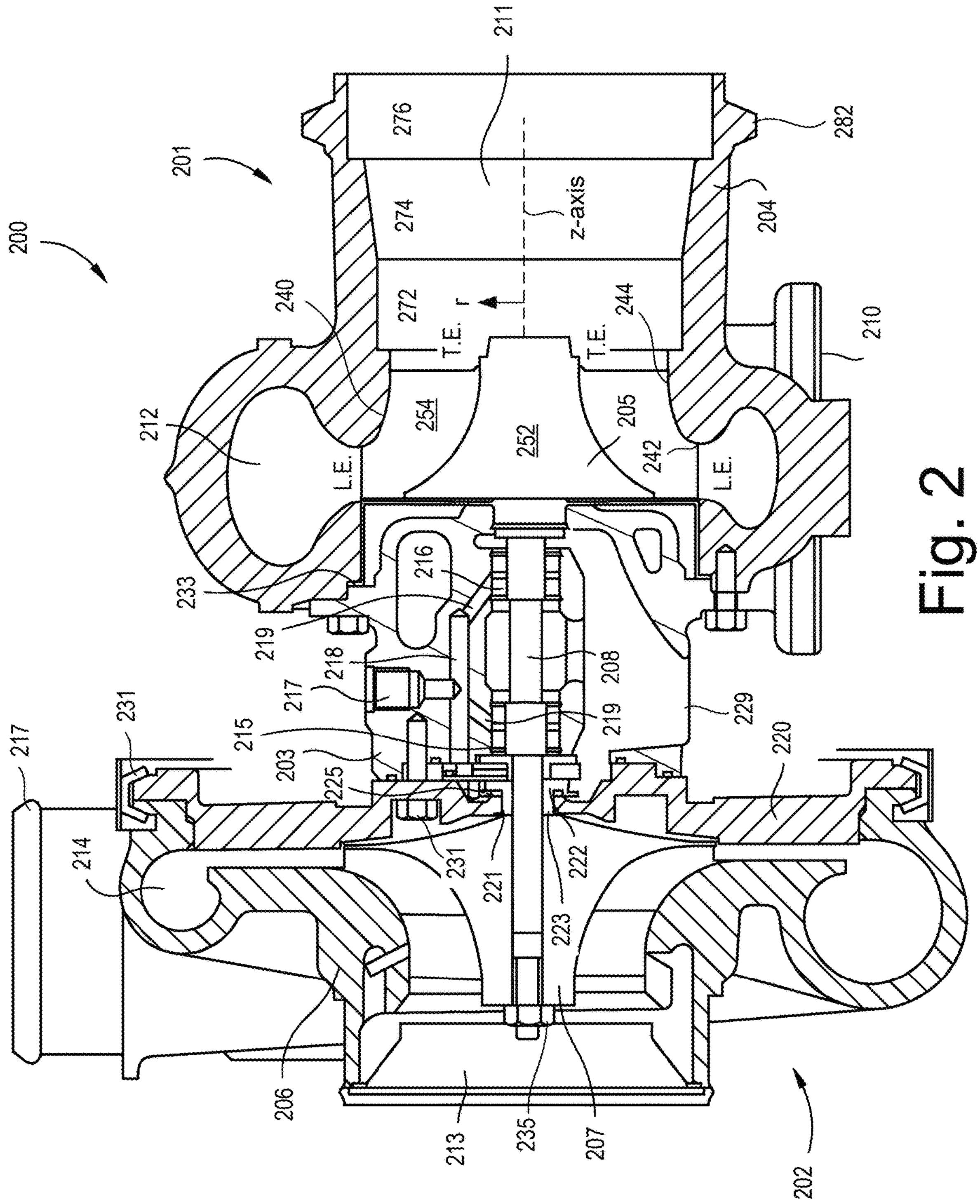
FIG. 2 is a cross-sectional view of an example of a turbocharger.

FIG. 2 shows an example of a turbocharger 200 that includes a turbine assembly 201, a compressor assembly 202 and a center housing 203. The turbine assembly 201 includes a turbine housing 204 that is shaped to accommodate a turbine wheel 205 and the compressor assembly 202 includes a compressor housing 206 that is shaped to accommodate a compressor wheel 207. As shown, a shaft 208 operatively couples the turbine wheel 205 and the compressor wheel 207 as supported by one or more bearings 215 and 216 in a through bore of the center housing 203.

As shown in FIG. 2, the turbine housing 204 can include an exhaust inlet 210 and an exhaust outlet 211 where a volute 212 is defined at least in part by the turbine housing 204. The volute 212 can be referred to as a scroll that decreases in its cross-sectional diameter as it spirals inwardly toward a turbine wheel space that accommodates the turbine wheel 205.

As shown in FIG. 2, the compressor housing 206 can include an air inlet 213 and an air outlet 211 where a volute 214 is defined at least in part by the compressor housing 206. The volute 214 can be referred to as a scroll that increases in its cross-sectional diameter as it spirals outwardly from a compressor wheel space that accommodates the compressor wheel 207.

Disposed between the compressor housing 206 and the center housing 203 is a backplate 220, which includes a bore 221 that can receive a thrust collar 222, which can abut against a base end 223 of the compressor wheel 207. As shown, the thrust collar 222 can include a lubricant slinger 225 that extends radially outward, which can help to reduce undesirable flow of lubricant (e.g., to the compressor wheel space, etc.).

The center housing 203 includes various lubricant features such as a lubricant inlet 217, a lubricant bore 218, lubricant jets 219, and a lubricant drain 229. As shown, lubricant can be provided at the lubricant inlet 217 to flow to the lubricant bore 218 and to the lubricant jets 219, which include a compressor side jet for directing lubricant to the bearing 215 and a turbine side jet for directing lubricant to the bearing 216. Lubricant can carry heat energy away from the bearings 215 and 216 as they rotatably support the shaft 208 as the turbine wheel 205 is driven by flow of exhaust through the turbine housing 204.

As shown in the example of FIG. 2, the compressor housing 206 can be clipped to the backplate 220 via a clip 231, the backplate 220 can be bolted to the center housing 203 via bolt or bolts 232 and the center housing 203 can be bolted to the turbine housing 204 via a bolt or bolts 233; noting that various other techniques may be utilized to couple the components to form a turbocharger.

In the example of FIG. 2, one or more of the housings 203, 204 and 206 may be cast. For example, the turbine housing 204 may be cast from iron, steel, nickel alloy, etc. As an example, consider a Ni-Resist cast iron alloy with a sufficient amount of nickel to produce an austenitic structure. For example, consider nickel being present from approximately 12 percent by weight to approximately 40 percent by weight. As an example, an increased amount of nickel can provide for a reduced coefficient of thermal expansion (e.g., consider a minimum at approximately 35 percent by weight). However, increased nickel content can increase cost of an Ni-Resist material; noting that density tends to be relatively constant over a large range of nickel content (e.g., approximately 7.3 to 7.6 grams per cubic centimeter). The density of Ni-Resist material tends to be approximately 5 percent higher than for gray cast iron and approximately 15 percent lower than cast bronze alloys. As to machinability, Ni-Resist materials tend to be better than cast steels; noting that increased chromium content tends to decrease machinability due to increasing amounts of hard carbides. When compared to stainless steel (e.g., density of approximately 8 grams per cubic centimeter), Ni-Resist materials can be less costly and of lesser mass (e.g., lesser density).

Ni-Resist materials tend to exhibit suitable high temperature properties, which may be at rated to over 480 degrees C. (900 degrees F.). Ni-Resist materials can be suitable for turbocharges for diesel and gasoline internal combustion engines. As an example, a diesel engine can have exhaust that may be at about 860 degrees C. and, as an example, a gasoline engine can have exhaust that may be at about 1050 degrees C. Such exhaust can be received by a turbine assembly that includes a turbine housing made of a suitable material.

As shown, the turbine housing 204 may be a relatively large component when compared to the compressor housing 206 and the center housing 203 such that the mass of the turbine housing 204 contributes significantly to the mass of the turbocharger 200.

In the example of FIG. 2, various components of the turbocharger 200 may be defined with respect to a cylindrical coordinately system that includes a z-axis centered on a through bore of the center housing 203, which can coincide with the rotational axis of a rotating assembly that includes the turbine wheel 205, the compressor wheel 207 and the shaft 208. As mentioned, a turbine wheel may be welded to a shaft to form a shaft and wheel assembly (SWA) and a compressor wheel may be threaded onto an end of a shaft (e.g., a "boreless" compressor wheel) or have a through bore that receives a free end of the shaft where a nut or other suitable component is used to secure the compressor wheel to the shaft. In the example of FIG. 2, the turbine wheel 205 is welded to the shaft 208 and a nut 235 is used to secure the compressor wheel 207 to the shaft 208 and, hence, the turbine wheel 205.

In the example of FIG. 2, a clearance exists between blades 254 that extend from a hub 252 of the turbine wheel 205 and a shroud portion 240 of the turbine housing 204. As shown, the shroud portion 240, in the cross-sectional view is "J" shaped, which can define a body of rotation that has an annular ridge portion 242 and a cylindrical portion 244. As shown, the annular ridge portion 242 can define a nozzle for exhaust that flows from the volute 212 to the turbine wheel space at an inducer portion of the turbine wheel 205, which can be defined by leading edges where each of the blades 254 includes a leading edge (L.E.). As shown, the turbine wheel 205 also includes an exducer portion where each of the blades 254 includes a trailing edge (T.E.). During operation, exhaust flows from the volute 212 via the nozzle defined in part by the annular ridge portion 242 of the shroud portion 240 to the leading edges of the blades 254, along channels defined by adjacent blades 254 of the turbine wheel 205 as confined between the hub 252 and the cylindrical portion 244 of the shroud portion 240 and then to the trailing edges of the blades 254 where the exhaust is confined by a larger diameter cylindrical wall 272, a slightly conical wall 274 and a yet larger diameter cylindrical wall 276. As shown in FIG. 2, the cylindrical wall 276 can be defined by a portion of the turbine housing 204 that includes a fitting such as an annular ridge 282 that can be utilized to secure an exhaust conduit to the turbine housing 204. Such an exhaust conduit may be in fluid communication with one or more other components such as an exhaust treatment unit, a muffler, another turbocharger, etc. As to the exhaust inlet 210 of the turbine housing 204, it too may be shaped to couple to one or more exhaust conduits such as, for example, an exhaust header, an exhaust manifold, another turbine housing (e.g., for a multi-stage turbocharger arrangement), etc.

As shown in FIG. 2, the turbine housing 204 serves various functions through its structural features and shapes thereof; however, such structural features can contribute to mass of the turbocharger.

As an example, a turbocharger may weigh from approximately 4 kilograms (e.g., 8.8 lbs) to approximately 40 kilograms (e.g., 88 lbs) or more.

As mentioned, a turbocharger can be defined with respect to a cylindrical coordinate system where a z-axis may be along a length. In the example of FIG. 2, the length of the turbine housing 204 is over 50 percent of the total length. The overall length or size of a turbocharger can be a factor when installing in an engine compartment of a vehicle as it presents design constraints.

The turbocharger 200 of FIG. 2 can be cooled via one or more media, such as lubricant (e.g., oil), water (e.g., radiator fluid, etc.), and air (e.g., via an environment with ambient air or vehicle engine compartment air).

As to lubricant cooling (e.g., oil, whether natural, synthetic, etc.), some tradeoffs exist. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system. To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to temperatures experienced during operation, they can depend on temperature of exhaust flowing to an exhaust turbine of a turbocharger, which can depend on whether an internal combustion engine is gasoline or diesel fueled (e.g., as mentioned, a diesel engine may have exhaust at about 860 degrees C. and a gasoline engine may have exhaust at about 1050 degrees C.).

Figure 3:
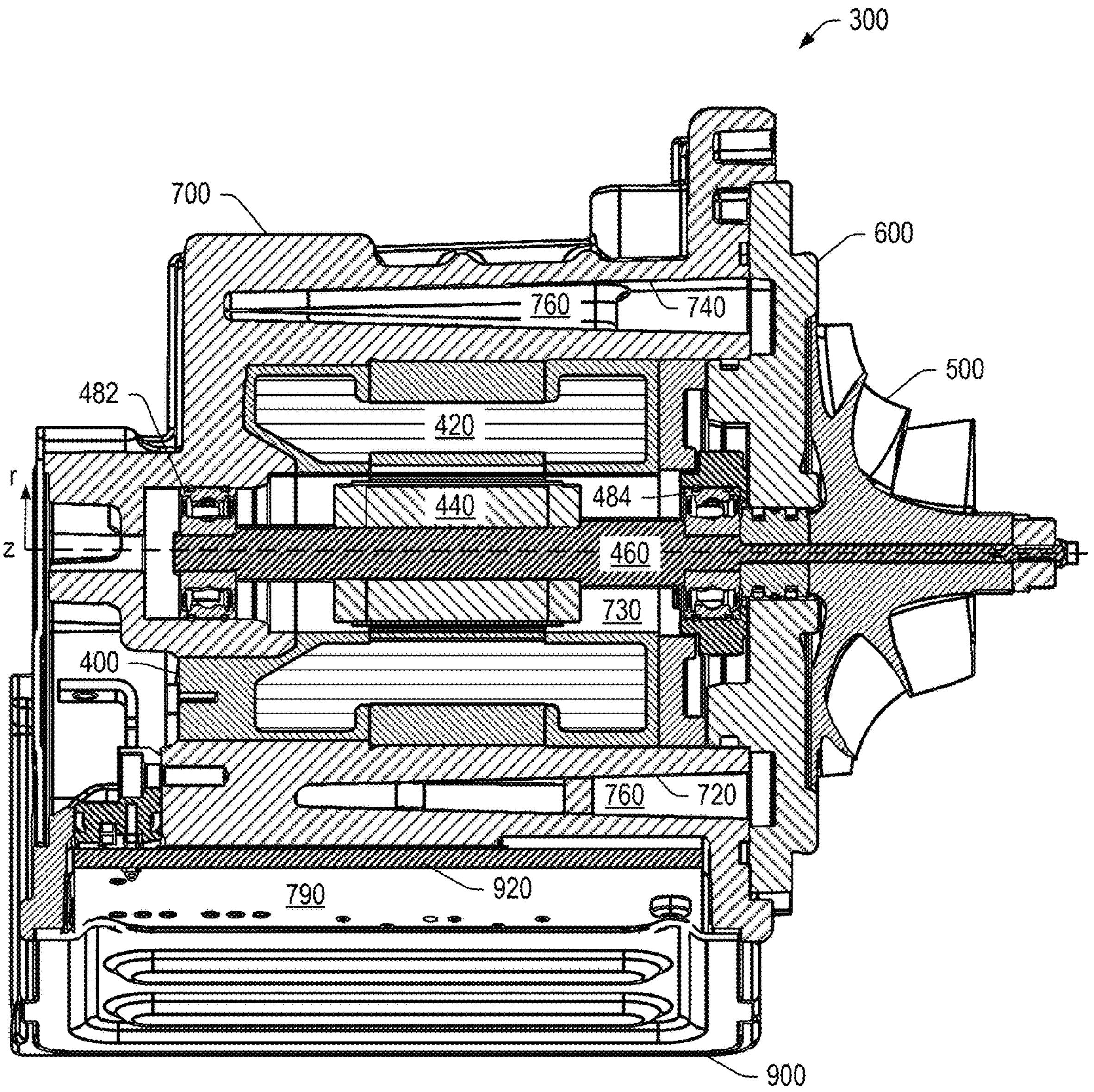
FIG. 3 is a cross-sectional view of an example of an electric compressor assembly.

FIG. 3 shows a cutaway view of an example of an electric compressor assembly 300 that includes an electric motor 400 that includes a stator 420 and a rotor 440, where the stator 420 defines an axis, z, and where the rotor 440 includes a shaft 460 substantially centered along the axis, z. As shown, the electric compressor assembly 300 includes a compressor wheel 500 coupled to the shaft 460 along with a back disk 600 disposed between the compressor wheel 500 and the electric motor 400. In the example of FIG. 3, the shaft 460 is rotatably supported by one or more bearings 482 and 484. As shown, the electric compressor assembly 300 includes a housing 700 that includes a bore wall 720 that seats the stator 420 (e.g., in a bore 730) and an outer wall 740, which may include a coolant inlet and a coolant outlet (see, e.g., FIG. 4) in fluid communication with a coolant passage 760 defined by and at least in part between the bore wall 720 and the outer wall 740. As an example, the electric compressor assembly 300 may include at least one pin disposed at least in part in the coolant passage 760, substantially parallel to the axis defined by the stator 420, that diminishes flow area within the coolant passage 760, for example, to define multiple flow paths within the coolant passage 760.

As shown, the electric compressor assembly 300 may include control electronics 900, for example, disposed in a recess 790 of the housing 700 where, for example, circuitry 920 may be included in the form of a circuit board and/or one or more other forms. As explained, an electric motor may generate heat energy as electrical power is transformed into electromotive power with some amount of loss (e.g., as heat energy, etc.). As an example, coolant may flow in the coolant passage 760 where the coolant acts as a heat transfer medium that may provide for heat transfer to and/or from the housing 700. For example, coolant may flow in the coolant passage 760 to remove heat energy from the electric motor and/or to remove heat energy from the circuitry 920. As shown, the outer wall 740 may be disposed at least in part between the coolant passage 760 and the circuitry 920. In such an example, heat energy may flow to the coolant passage 760 via the bore wall 720 (e.g., to cool the electric motor 400) and heat energy may flow to the coolant passage 760 via the outer wall 740 (e.g., to cool the circuitry 920). As an example, one or more temperature sensors may be provided (e.g., as part of the circuitry 920, etc.) where coolant flow and/or temperature may be controlled to control temperature of the electric motor 400, the circuitry 920 and/or one or more other features of the electric compressor assembly 300.

In the example of FIG. 3, various components, features, etc., may be described and/or defined with respect to one or more coordinates of one or more coordinate systems. For example, consider a cylindrical coordinate system with an axial coordinate z, a radial coordinate r, and an azimuthal coordinate Θ (e.g., theta). In the example of FIG. 3, the axis z may be an axis of a cylindrical coordinate system where a radial coordinate, r, may be represented by a vector normal to the axis z. In the example of FIG. 3, the cutaway view may be through one or more z,r-planes that may be defined by one or more azimuthal angles (e.g., one or more Θ angles) where the azimuthal coordinate ranges from an angle of 0 degrees to 360 degrees. As an example, 0 degrees may be defined to coincide with one or more features.

Figure 4:
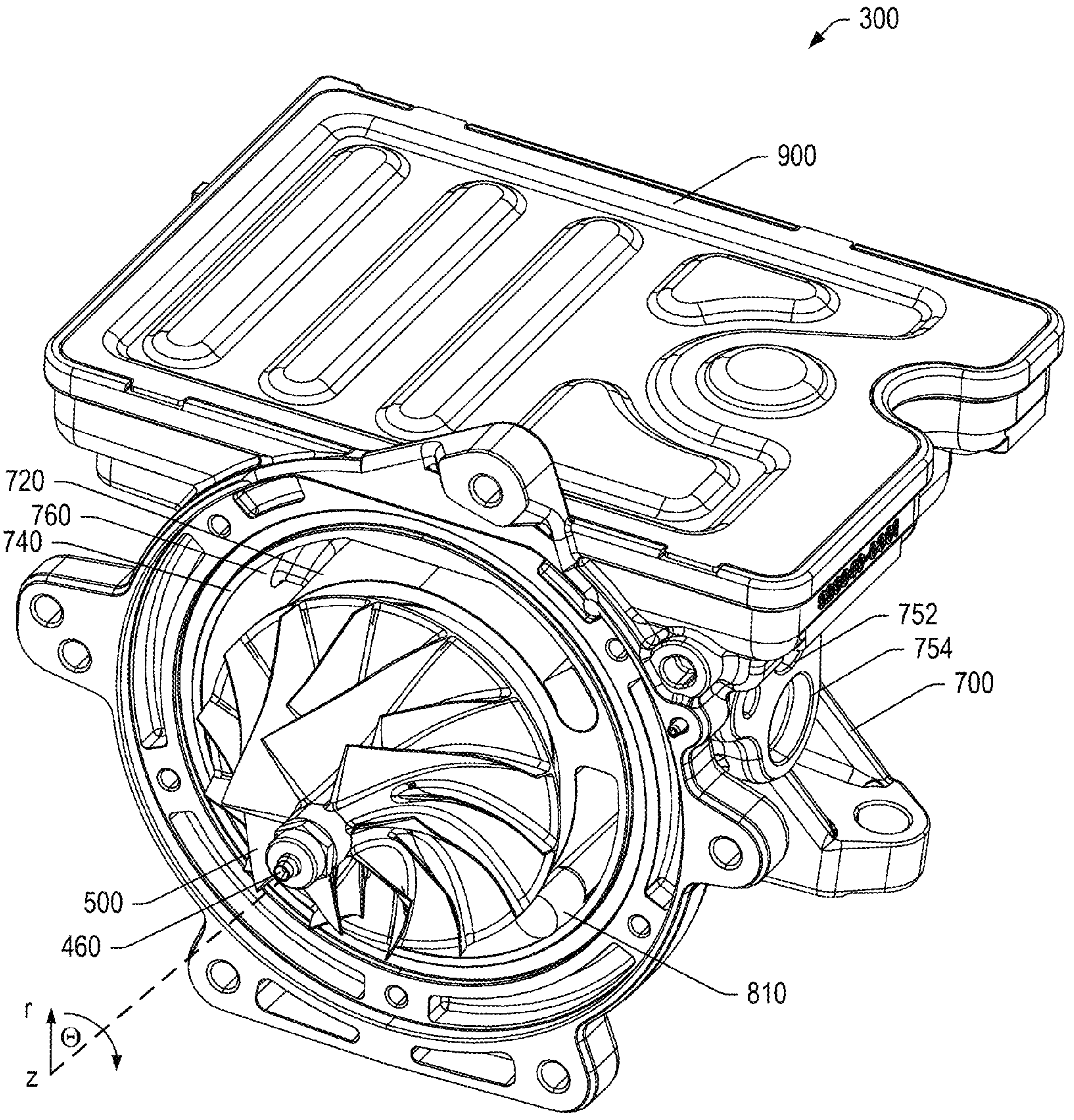
FIG. 4 is a perspective view of an example of an electric compressor assembly.

FIG. 4 shows a perspective view of an example of the electric compressor assembly 300 where examples of a coolant inlet 752 and a coolant outlet 754 are shown as being integral with the outer wall 740 of the housing 700. As explained, the coolant inlet 752 and the coolant outlet 754 can be in fluid communication with the coolant passage 760. In the example of FIG. 4, a cylindrical coordinate system is shown with coordinates z, r, and Θ. As an example, the azimuthal coordinate may be defined with 0 degrees at the top, for example, where the outer wall 740 of the housing 700 may include a substantially flat, planar portion that may correspond to a region of the circuitry 920 (e.g., consider MOSFET circuitry, etc.).

In the example of FIG. 4, the electric compressor assembly 300 is also shown as including at least one pin 810 that is disposed at least in part in the coolant passage 760, substantially parallel to the z-axis (e.g., as may be defined by the stator 420), that diminishes flow area within the coolant passage 760, for example, to define multiple flow paths within the coolant passage 760. As shown, the position of the pin 810 may be defined by an azimuthal coordinate (e.g., an angle as may be measured from the 0 degree reference point for Θ).

Figure 5:
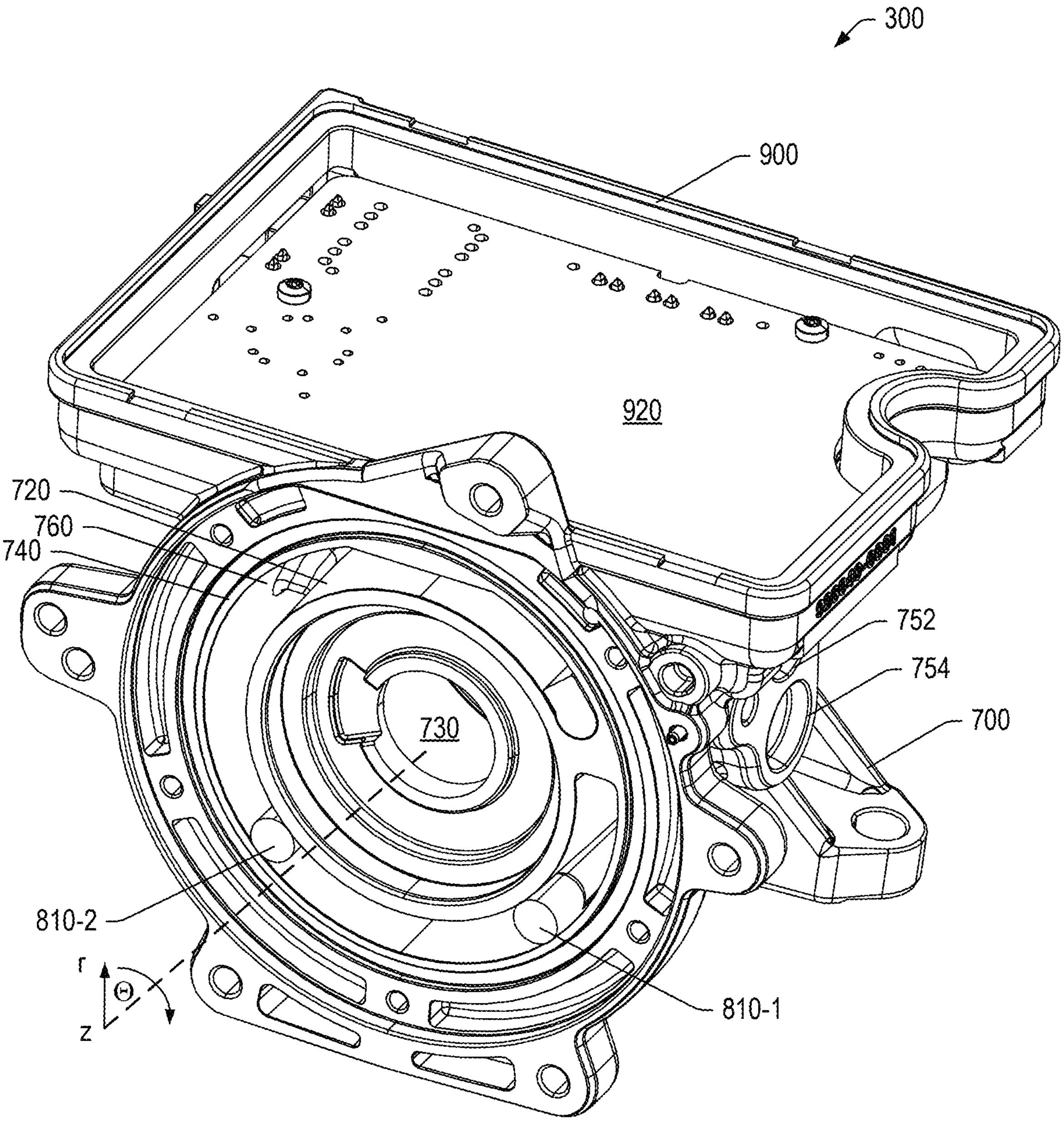
FIG. 5 is a perspective view of an example of a portion of an electric compressor assembly.

FIG. 5 shows a perspective view of a portion of the electric compressor assembly 300 where the bore 730 is visible along with pins 810-1 and 810-2 that can be disposed at least in part in the coolant passage 760, substantially parallel to the z-axis defined by the stator 420, that diminishes flow area within the coolant passage 760, for example, to define multiple flow paths within the coolant passage 760. As shown, each of the positions of the pins 810-1 and 810-2 may be defined by an azimuthal coordinate (e.g., an angle as may be measured from the 0 degree reference point for Θ).

Figure 6:
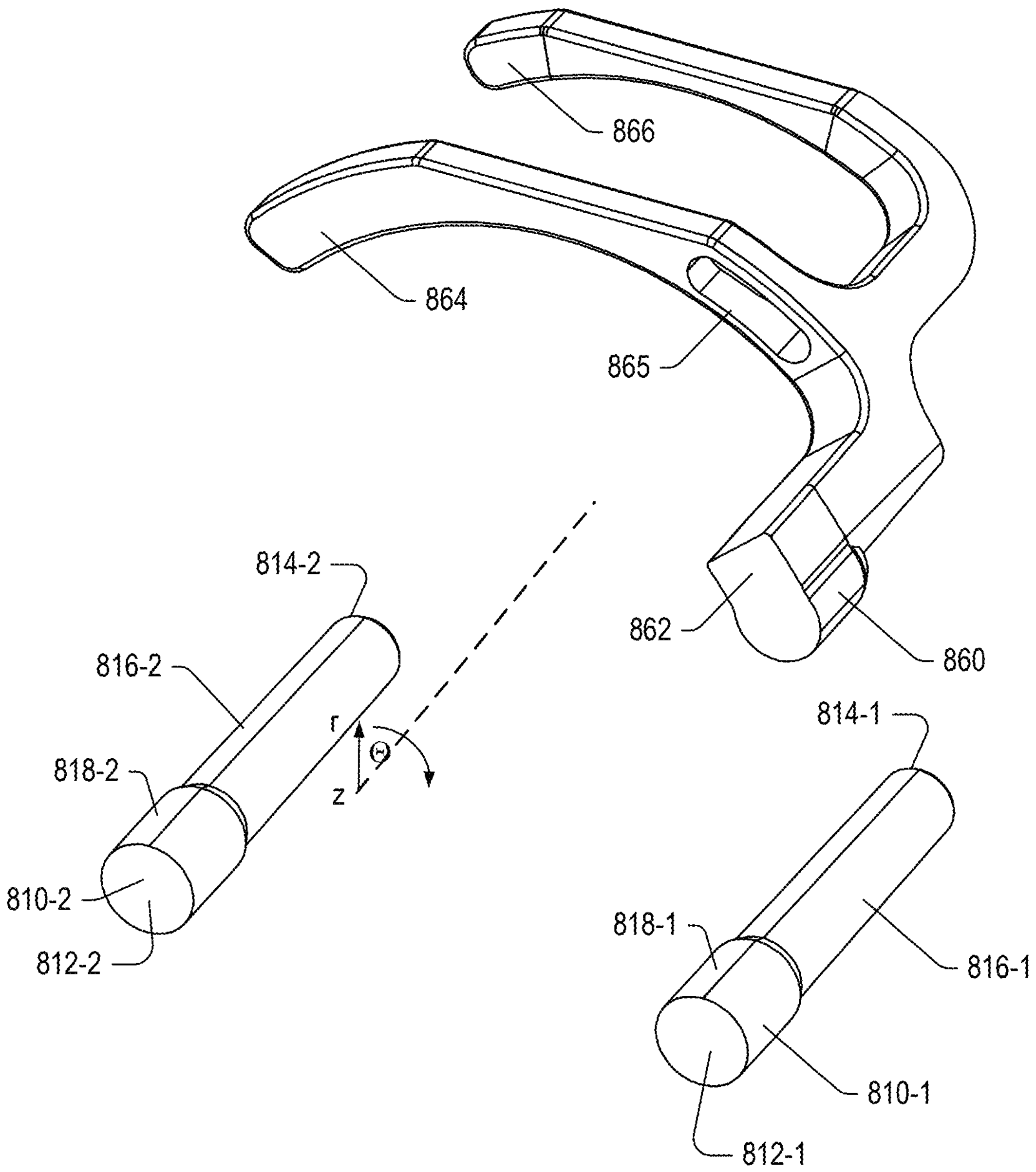
FIG. 6 is a perspective view of an example of an arrangement of components.

FIG. 6 shows a perspective view of an example of an arrangement of components 810-1, 810-2, and 860 that may be disposed at least in part in the coolant passage 760. In the example of FIG. 6, the components 810-1 and 810-2 can be pins that each include a proximal end 812-1 and 812-2, a distal end 814-1 and 814-2, a head portion 818-1 and 818-2 at the proximal end 812-1 and 812-2 and a pin surface 816-1 and 816-2 that extends from the head portion 818-1 and 818-2 to the distal end 814-1 and 814-2. In such an example, one or more of the pin surfaces 816-1 and 816-2 may be cylindrical, conical and/or another shape. As an example, a pin surface may have a constant radius and/or may have a varying radius along a length of a pin. As an example, a radius of a pin may be measured from an axis of a pin such as a longitudinal axis that extends along at least a portion of a pin.

As an example, a pin may be shaped and/or sized for positioning at least in part in a coolant passage to thereby alter flow in the coolant passage. In such an example, the pin may help to improve heat transfer to and/or from a coolant that flows in the coolant passage. As an example, a pin or pins may help to reduce the presence of one or more low flow zones (e.g., consider a dead zone where coolant may be relatively stagnant).

Figure 8:
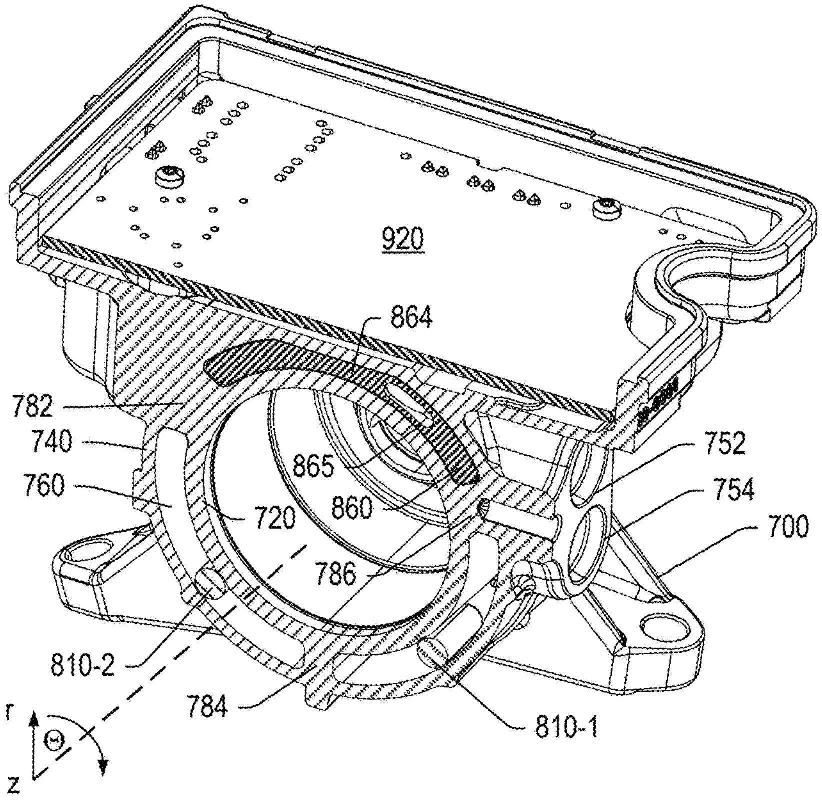
FIG. 8 is a cutaway view of an example of a portion of an electric compressor assembly.

As to the component 860, it may be inserted into a coolant passage, for example, via an open side of the coolant passage. As an example, the component 860 may be shaped and/or sized to be inserted into the coolant passage 760 to thereby alter coolant flow therein. As shown, the component 860 may include a head portion 862 and one or more legs 864 and 866 where one or more of the legs 864 and 866 may include an opening 865 (e.g., a notch, etc.) that operates as a coolant sub-passage. As shown, the opening 865 may be provided with respect to the leg 864 to provide for passage of at least some amount of coolant to a space defined at least in part by the legs 864 and 866. In the example of FIG. 8, the component 860 defines a curved U-shape that may constrain and/or direct at least a portion of coolant flow in a coolant passage.

As an example, an electric compressor assembly may include one or more pins, with or without one or more other components. For example, consider an arrangement of pins or an arrangement of at least one pin and at least one other component that may include one or more legs (e.g., arced legs, etc.).

In the example of FIG. 6, one or more of the head portions 818-1, 818-2, and/or 862 may provide for securing a component with respect to a coolant passage of an electric compressor assembly. For example, consider an interference fit, a geometric fit (e.g., key and keyway), etc. As an example, a back disk and/or one or more other components may be assembled together with a housing to secure one or more pins, etc., in a coolant passage defined at least in part by the housing (e.g., between a bore wall and an outer wall, etc.).

As shown, one or more features, positions, etc., of one or more of the components 810-1, 810-2, and 860 may be defined by using the cylindrical coordinate system with coordinates z, r, and Θ. For example, the components 810-1, 810-2, and 860 may be defined using one or more angles, one or more axial lengths, one or more radial positions, etc. As an example, the component 860 may be defined by one or more angular spans where each of the legs 864 and 866 may be defined by axial thicknesses at axial positions with respect to the z-axis. As an example, the leg 864 and the leg 866 may differ as to angular span where, for example, the leg 864 may have a greater angular span than the leg 866 where the leg 864 is at a lesser axial position (e.g., set shallower into the coolant passage 760) and where the leg 866 is at a greater axial position (e.g., set deeper into the coolant passage 760).

FIG. 7, FIG. 8, FIG. 9, FIG. 10, FIG. 11, and FIG. 12 show example cutaway views of the example electric compressor assembly 300 as a series of axial positions moving from a compressor end to a terminal end. These views provide for visualization of the example coolant passage 760 along with the example components 810-1, 810-2, and 860; noting that one or more other arrangements of components may be utilized. In these views, various features, components, etc., may be described and/or defined with respect to one or more coordinates of one or more coordinate systems such as, for example, a cylindrical coordinate system as shown with coordinates z, r, and Θ.

As an example, the housing 700 may be a cast housing that may be cast and machined. As an example, the housing 700 may be a metallic housing such as, for example, a housing cast of a material that includes one or more metals. As an example, the housing may be a cast metallic housing that includes aluminum (e.g., consider the cast metallic housing as being a cast aluminum housing).

As an example, one or more components disposed at least in part in a coolant passage (e.g., one or more pins, etc.) may be made of a metallic material and/or a non-metallic material. As an example, a non-metallic material may be a polymeric material. As an example, consider a polymeric material of the polyaryletherketone (PAEK) family. For example, consider polyether ether ketone (PEEK), which is an organic thermoplastic polymer.

PEEK may have a Young's modulus of approximately 3.6 GPa and may have a tensile strength of approximately 90 MPa. PEEK may have a glass transition temperature of approximately 143 degrees C. (e.g., approximately 289 degrees F.). PEEK may melt at approximately 343 degrees C. (e.g., approximately 662 degrees F.). As an example, various types of PEEK may have a useful operating temperature of up to approximately 250 degrees C. (e.g., approximately 482 degrees F.). As an example, thermal conductivity of PEEK may increase nearly linearly with temperature between room temperature and solidus temperature. As an example, PEEK may be relatively resistant to thermal degradation (e.g., within its rated operating range) as well as to attack by both organic and aqueous environments. As an example, one or more polymeric materials, ceramic materials, composite materials, etc., may be utilized, which may include one or more types of materials that may alter heat stability, heat-related properties, coolant compatibility, compatibility with a housing material, etc.

Figure 7:
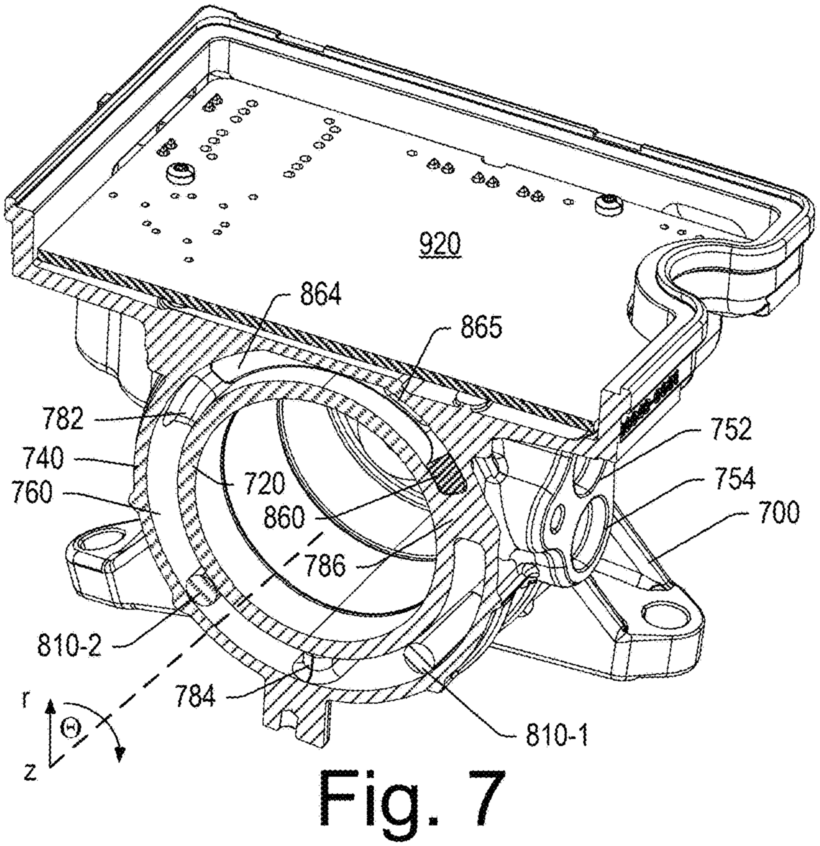
FIG. 7 is a cutaway view of an example of a portion of an electric compressor assembly.

In the example cutaway view of FIG. 7, the housing 700 is shown as including one or more bridges 782, 784, and 786 between the bore wall 720 and the outer wall 740. As shown, the bridge 786 separates the coolant inlet 752 from the coolant outlet 754 such that short-circuiting of coolant flow does not occur. Hence, the bridge 786 helps to ensure that coolant entering the coolant inlet 752 flows through the coolant passage 760 in an azimuthal and/or axial manner to reach the coolant outlet 754. As to the bridge 782, it provide for electrical connection to the electric motor 400. Unlike the bridge 786, the bridge 782 does not span an axial length of the coolant passage 760 but rather only a portion of the axial length of the coolant passage 760. As to the bridge 784, it provides for directing flow in the coolant passage 760 as it does not span the axial length of the coolant passage 760, thereby leaving a gap for coolant flow.

As an example, a housing may include one or more bridges between a bore wall and an outer wall for one or more purposes, which may or may not be related directly to coolant flow in a coolant passage. For example, consider a purpose to provide for electrical connection and/or for housing integrity. For example, in FIG. 7, the three bridges 782, 784, and 786 are set at approximately 120 degree offsets as may be measured azimuthally about a central longitudinal axis of the housing 700. For example, consider azimuthal angles per the azimuthal coordinate Θ as measured about the z-axis. Such an approach may provide for improved structural integrity of the housing 700, for example, to handle thermal issues, electromagnetic issues, shock and/or vibration issues, etc. As an example, one or more bridges may provide for improved integrity with respect to casting of a housing with a coolant passage therein.

In the example of FIG. 7, the components 810-1, 810-2, and 860 are shown where the components 810-1 and 810-2 are pins and where the component 860 includes arms where the arm 864 is visible along with the opening 865. As shown, the arm 864 extends to a side of the bridge 782 (e.g., seated against the side of the bridge 782) such flow is hindered between an end of the arm 864 and the side of the bridge 782. Further, the head portion 862 of the component 860 is seated against the bridge 786. Thus, the component 860 may include a leg such as the leg 864 that extends over an arc (e.g., an azimuthal angle span) between two bridges (e.g., the bridges 782 and 786) that bridge the bore wall 720 and the outer wall 740.

As shown, the component 810-1 is disposed at an azimuthal position (e.g., an azimuthal angle) between the bridge 782 and the bridge 784 and the component 810-2 is disposed at an azimuthal position (e.g., an azimuthal angle) between the bridge 784 and the bridge 786. Each of the components 810-1 and 810-2 can extend an axial distance in the coolant passage 760 that may be less than an axial length of the coolant passage 760.

As an example, the coolant inlet 752 may be positioned closer to the circuitry 920 than the coolant outlet 754. In such an example, cooler (e.g., lower temperature) coolant may flow in the coolant passage 760 to cool the circuitry 920. For example, the lower temperature may help to increase a temperature differential that may help to transfer heat energy from the circuitry 920 via the outer wall 740 to coolant in the coolant passage 760. In the example of FIG. 7, the circuitry 920 is shown as being in the form of a board (e.g., a substantially flat or planar board). As shown, the outer wall 740 of the housing 700 may include a substantially flat or planar portion adjacent to the circuitry 920 that may provide for increased heat transfer area between the circuitry 920 and the outer wall 740.

In the example cutaway view of FIG. 8, the arm 864 is shown as extending between the bridges 782 and 786 where the opening 865 provides for coolant flow.

Figure 9:
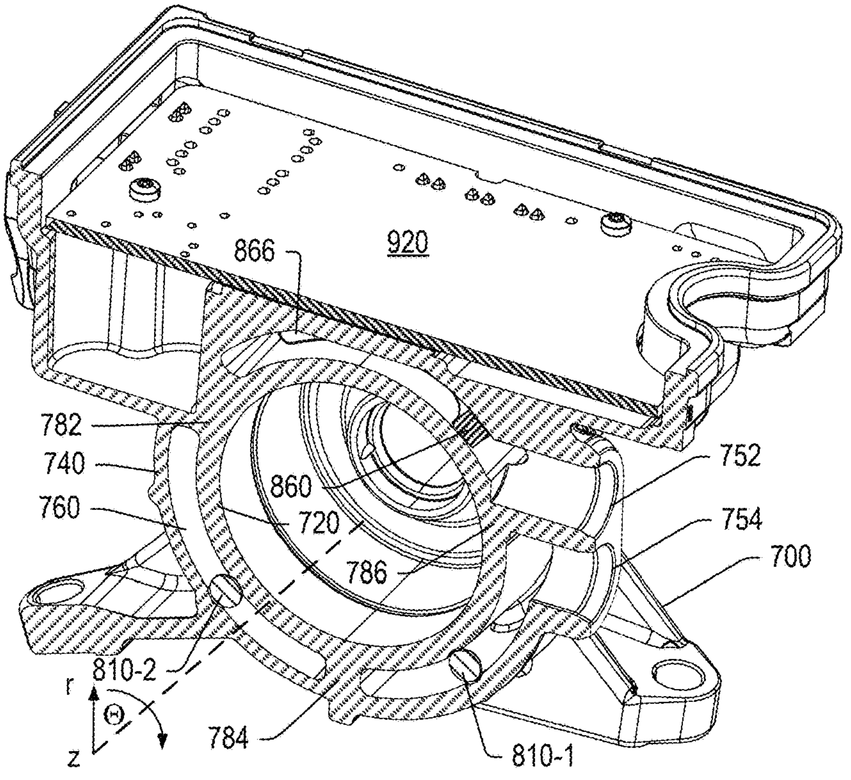
FIG. 9 is a cutaway view of an example of a portion of an electric compressor assembly.

In the example cutaway view of FIG. 9, the arm 866 of the component 860 is shown as being disposed in the coolant passage 760, along with the components 810-1 and 810-2. In the axial cross-section of FIG. 9, the axial position is near the end 814-1 of the component 810-1 and near the end 814-2 of the component 810-2. Further, the axial position provides for viewing how the coolant inlet 752 and the coolant outlet 754 are in fluid communication with the coolant passage 760. As shown, the bridge 786 separate the coolant inlet 752 from the coolant outlet 754.

Figure 10:
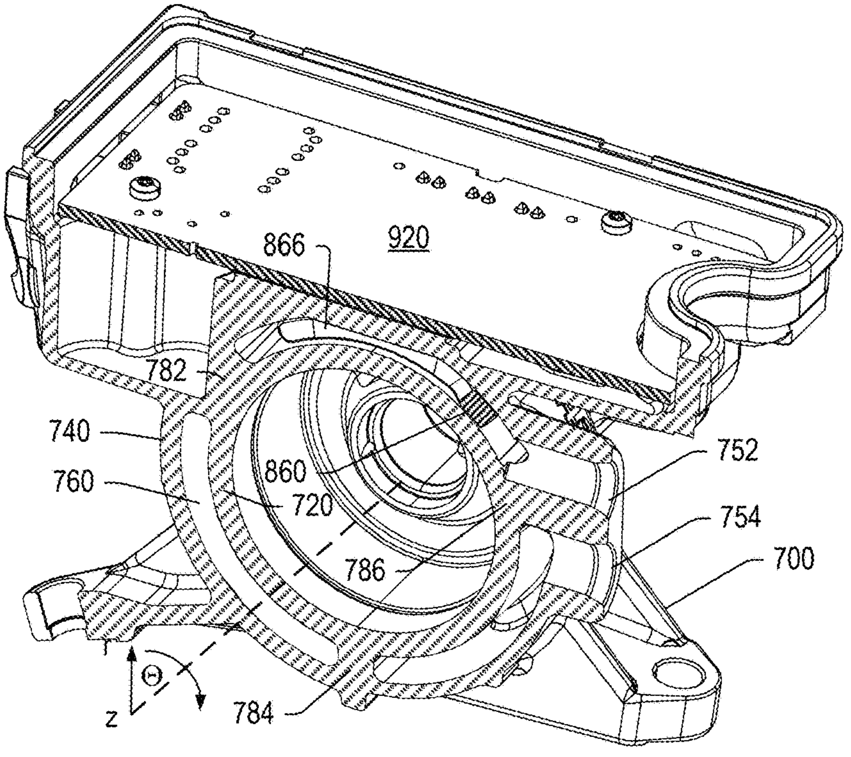
FIG. 10 is a cutaway view of an example of a portion of an electric compressor assembly.

In the example cutaway view of FIG. 10, the arm 866 is visible, which, at its free end, does not extend to the bridge 782; hence, a gap exists between the free end and the bridge 782 that can provide a path for coolant flow. For example, a side of the bridge 782 and the free end of the arm 866 may define a gap for coolant flow (e.g., a gap defined at least in part by an arc or an angular span).

Figure 11:
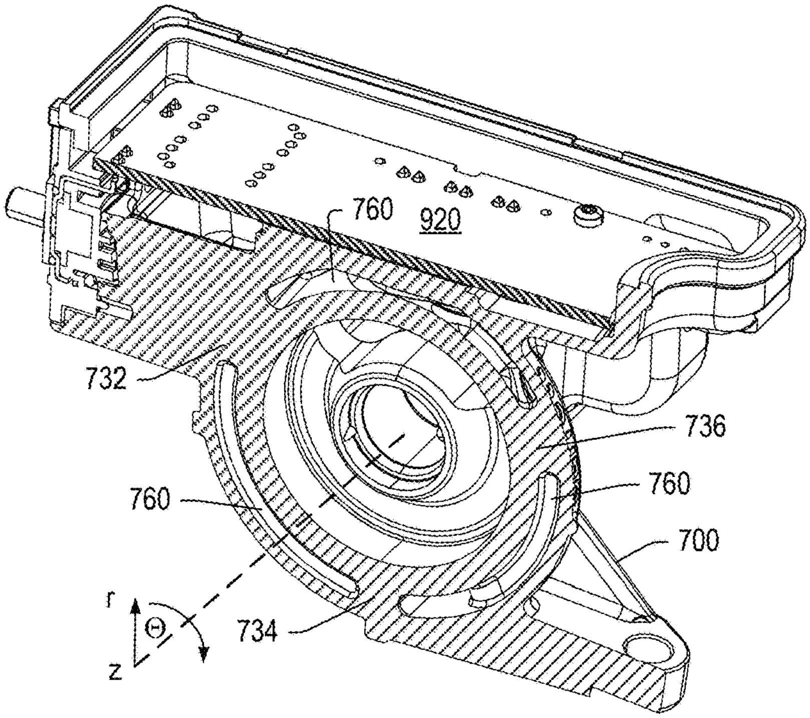
FIG. 11 is a cutaway view of an example of a portion of an electric compressor assembly.

In the example cutaway view of FIG. 11, the coolant passage 760 is shown as including three portions, as may be defined between the bridges 732, 734, and 736.

Figure 12:
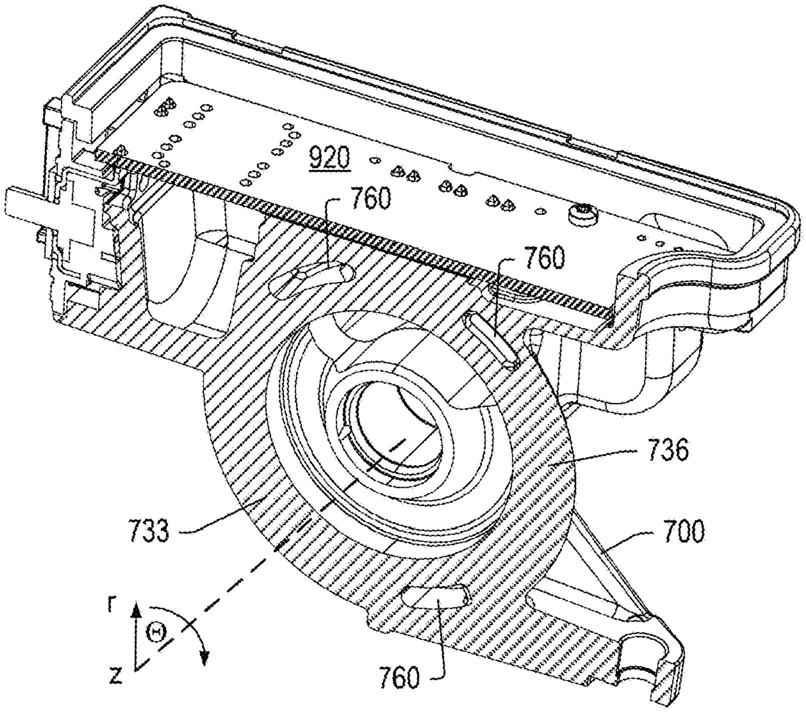
FIG. 12 is a cutaway view of an example of a portion of an electric compressor assembly.

In the example cutaway view of FIG. 12, three portions of the coolant passage 760 are visible, noting that the bridges 732 and 734 are joined, shown as a bridge 733.

Figure 13:
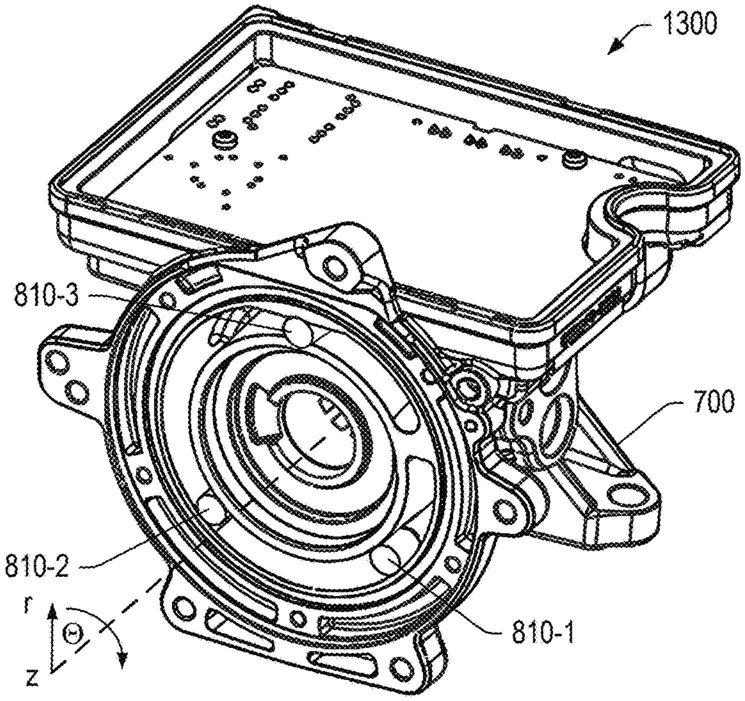
FIG. 13 is a perspective view of an example of a portion of an electric compressor assembly.

FIG. 13 shows a perspective view of an example of an electric compressor assembly 1300 that includes various features of the electric compressor assembly 300; noting that the electric compressor assembly 1300 of the example of FIG. 13 includes three components 810-1, 810-2, and 810-3 that may be provided as pins.

Figure 14:
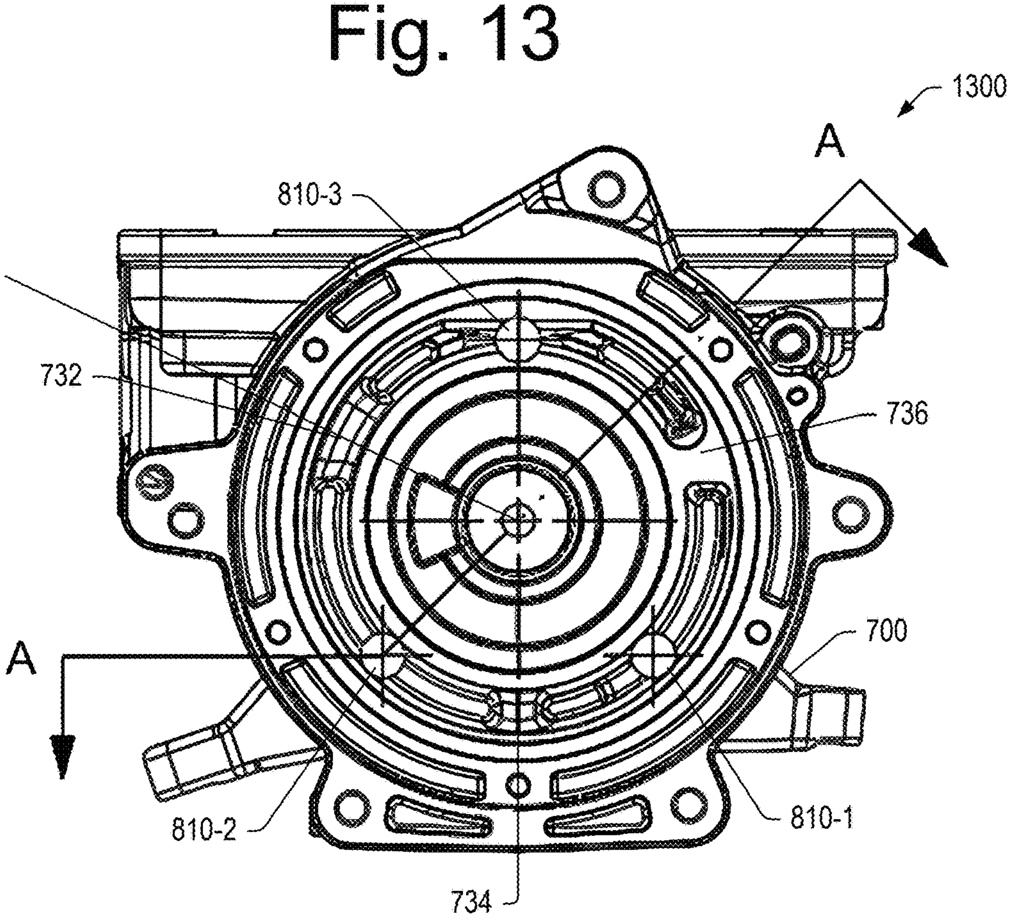
FIG. 14 is a front view of an example of a portion of an electric compressor assembly.

FIG. 14 shows a front view of the electric compressor assembly 1300 where the components 810-1, 810-2, and 810-3 are arranged at various azimuthal angles about a central axis. For example, the component 810-3 may be positioned at an azimuthal angle Θ of approximately 0 degrees, the component 810-1 may be positioned at an azimuthal angle Θ of approximately 135 degrees, and the component 810-2 may be positioned at an azimuthal angle Θ of approximately 215 degrees. As shown, the bridges 732, 734, and 736 may be positioned at azimuthal angles of approximately 72 degrees, approximately 180 degrees, and approximately 295 degrees. Hence, various portions of the coolant passage 760 may be defined by one or more of the bridges 732, 734, and 736 and/or one or more of the components 810-1, 810-2, and 810-3.

Figure 15:
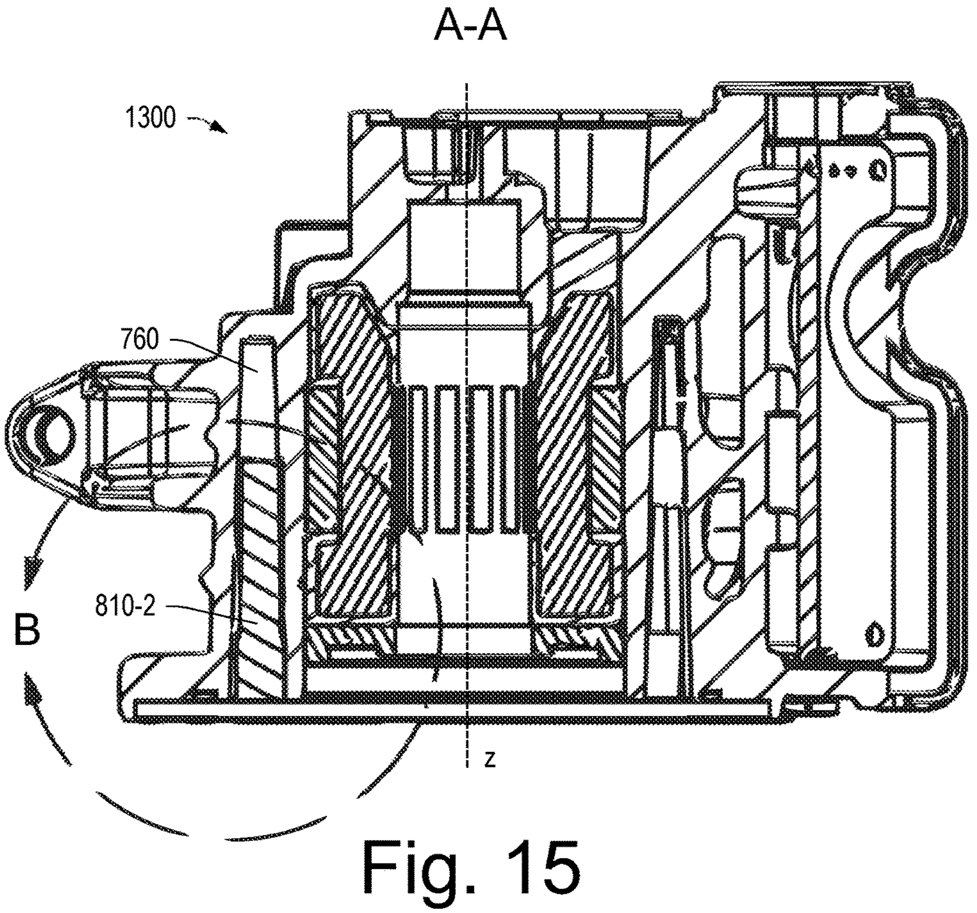
FIG. 15 is a cutaway view of an example of a portion of an electric compressor assembly.

FIG. 15 shows a cutaway view of the electric compressor assembly 1300 along a line A-A as indicated in FIG. 14. In the view of FIG. 15, the component 810-2 is shown in cross-section as disposed in the coolant passage 760.

Figure 16:
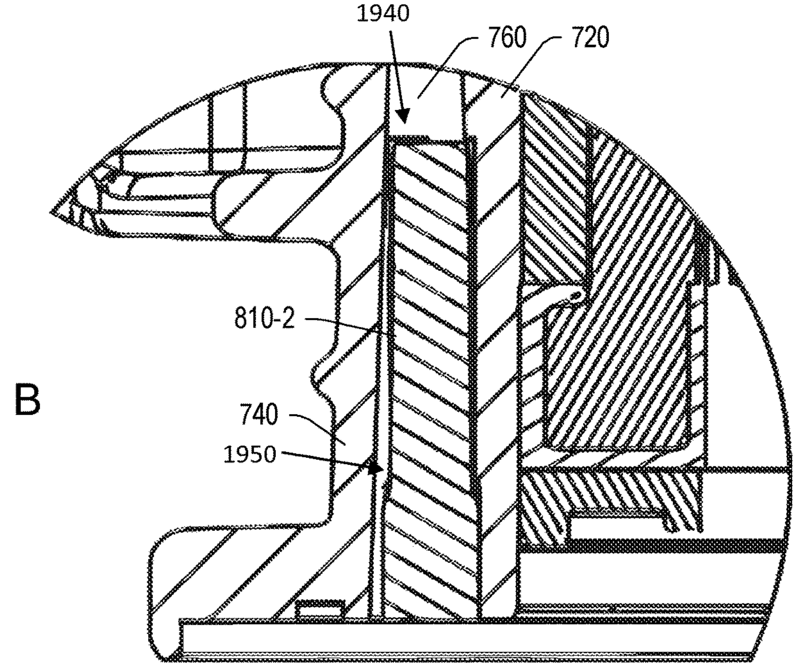
FIG. 16 is a cutaway view of an example of a portion of an electric compressor assembly.

FIG. 16 shows an enlarged cutaway view of a portion of the electric compressor assembly 1300 of FIG. 15, indicated by the label B, where a profile of the component 810-2 may be discerned. For example, the component 810-2 may be pin-shaped and include a cone angle where a clearance can exist between the component 810-2 and the bore wall 720 and/or where a clearance can exist between the component 810-2 and the outer wall 740. As shown, the outer wall 740 may include an outer surface that may be exposed to the environment, for example, where heat transfer may occur from the outer wall 740 to the environment, which may depend on environmental conditions (e.g., temperature, humidity, air flow, etc.). As shown, the component 810-2 does not extend to an end of the coolant passage 760 such that there is a gap between a distal end of the component 810-2 and an end of the coolant passage 760 where the gap may provide for flow of coolant.

Figure 17:
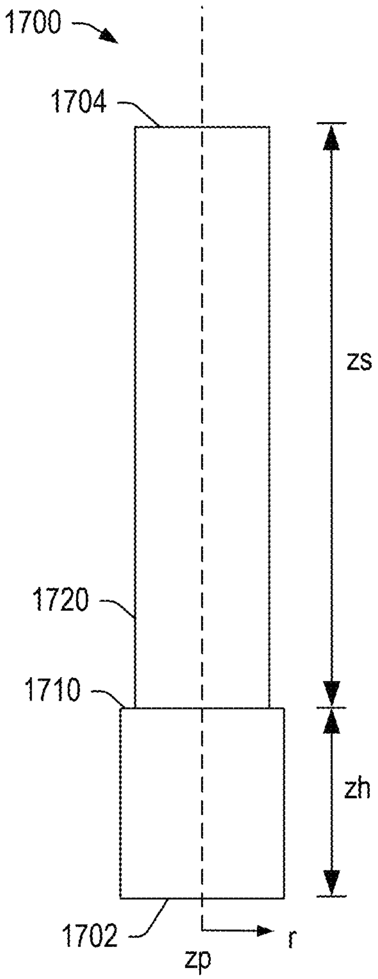
FIG. 17 is a side view of an example of a component.

FIG. 17 shows an example of a component 1700 that includes a proximal end 1702, a distal end 1704, a head portion 1710, and a flow portion 1720. As shown, the component 1700 may be defined by an axis, zp, that may be utilized to define an axial length or axial lengths (e.g., zh, zs, etc.), one or more axial features, and/or one or more radii and/or diameters, if present (see, e.g., the radial coordinate r).

Figure 18:
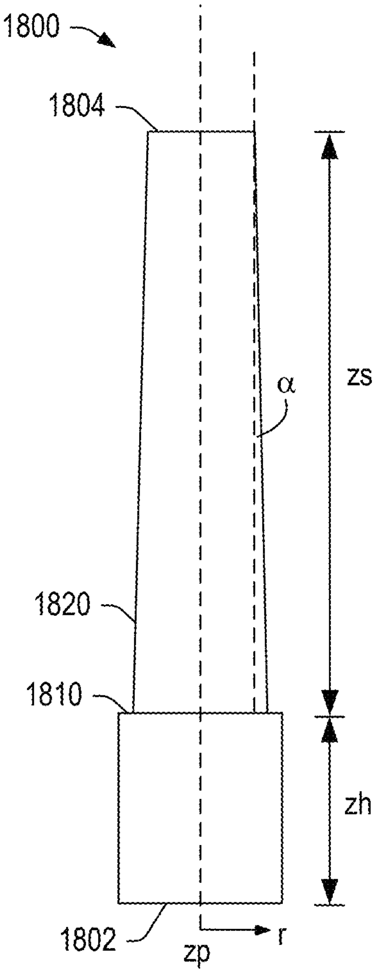
FIG. 18 is a side view of an example of a component.

FIG. 18 shows an example of a component 1800 that includes a proximal end 1802, a distal end 1804, a head portion 1810, and a flow portion 1820. As shown, the component 1800 may be defined by an axis, zp, that may be utilized to define an axial length or axial lengths (e.g., zh, zs, etc.), one or more axial features, and/or one or more radii and/or diameters, if present (see, e.g., the radial coordinate r). As shown, the flow portion 1820 may be defined by an angle, $\alpha$, that may be a cone angle such that the flow portion has a conical shape (e.g., at least a portion of a cone). As an example, a straight pin, which may be a cylindrical pin, may have a cone angle of 0 degrees. As an example, a cone angle may be selected to determine one or more clearances. As an example, a cone angle may be greater than approximately 0.05 degrees and less than approximately 60 degrees. In the example of FIG. 16, the component 810-2 may include a cone angle that is greater than 0 degrees, less than 1 degree to several degrees (e.g., 3 degrees) or more than several degrees. As shown, a component may be defined using a cone angle where the component is truncated such that it is a section of a cone along a longitudinal cone axis, for example, without a cone end. As an example, a coolant passage may include an angle that may be defined in a cross-sectional view where, for example, along an axial direction, one or more walls that define a coolant passage may converge toward each other or one wall may converge toward another wall. In such an example, the angle may be utilized to determine a shape and/or size of a component such as a pin. As an example, a cone angle of a pin may be greater than an angle of a wall or walls of a coolant passage such that the pin may be positioned in a coolant passage, for example, to define one or more clearances with respect to a wall or walls.

Figure 19:
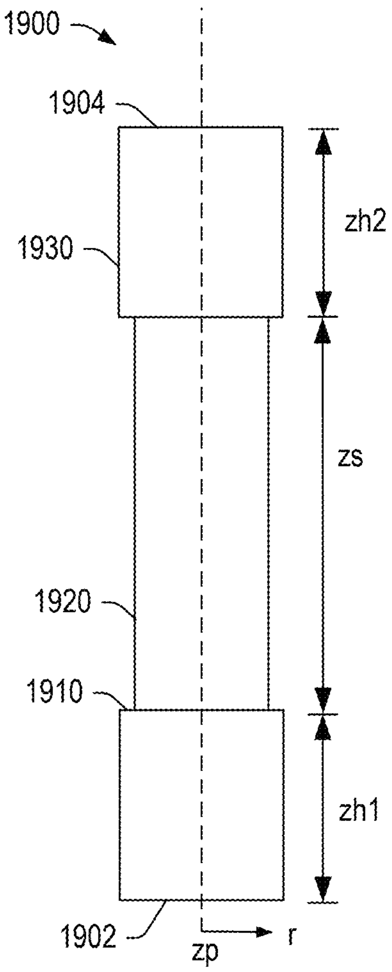
FIG. 19 is a side view of an example of a component.

FIG. 19 shows an example of a component 1900 that includes a proximal end 1902, a distal end 1904, a proximal head portion 1910, a flow portion 1920, and a distal head portion 1930. As shown, the component 1900 may be defined by an axis, zp, that may be utilized to define an axial length or axial lengths (e.g., zh1, zs, zh2, etc.), one or more axial features, and/or one or more radii and/or diameters, if present (see, e.g., the radial coordinate r).

As an example, a component may include one or more portions that may be suitable for locating the component. For example, consider a head portion that may be fit into a socket, which may be via an interference fit and/or one or more other types of mechanisms (e.g., key and keyway, etc.).

As explained, an electric compressor assembly may include a coolant passage that may be defined by and between two walls. In such an example, the coolant passage may be an annulus, which may be a part of an annulus that may vary in shape and/or size with respect to an axial coordinate as may be defined along a central axis (e.g., as may be defined by a stator, a rotor and/or a shaft of an electric motor).

As an example, a coolant inlet and a coolant outlet may be arranged to be adjacent to one another or otherwise closely located, which may facilitate coupling to one or more flanges, conduits, etc.

As an example, a coolant passage may be open at an axial face at one side and closed at an opposing side, for example, where a bore wall and an outer wall may meet to close the coolant passage and define an axial end of the coolant passage. As an example, an open side of a coolant passage may be sealed using a plate, which may be, for example, a back disk for a compressor wheel. In such an example, one or more gaskets may be present to provide for a fluid seal (e.g., as may be disposed in one or more grooves, etc.).

As an example, coolant may flow in a coolant passage in a manner that may be characterized by one or more parameters, which may include direction, magnitude, viscous forces, convective forces, etc. As an example, flow may be in part circumferential over at least a portion of a circumference of a bore wall and/or flow may be in part axial, for example, along an axial direction within a coolant passage. As an example, flow may be turbulent and/or laminar. As an example, flow may be defined using one or more dimensionless numbers such as, for example, the Reynolds number (Re), which may be utilized to estimate where flow may be laminar and/or turbulent, which may depend on one or more of overall flow rate, viscosity, density, temperature, coolant passage dimensions, etc.

As an example, one or more dimensionless numbers may include one or more of Re, Prandtl number (Pr) (e.g., ratio of momentum diffusivity to thermal diffusivity), Nusselt number (Nu) (e.g., ratio of total heat transfer to conductive heat transfer at a boundary in a fluid), etc.

To intensify cooling ability, an electric compressor assembly may include one or more components, which may include one or more pins. For example, consider a method of assembly that can include inserting one or more pins at least in part into a coolant passage of a housing. As an example, a pin may be a variable that has a varying radius or diameter along an axial coordinate (e.g., along an axial length). As an example, a component may be inserted and positioned to improve cooling ability (e.g., heat transfer) as to one or more features such as, for example, electronics (e.g., circuitry, etc.). As an example, a housing may include an integral recess that can receive electronics that may be cooled via a coolant passage of the housing.

As an example, a housing may include a coolant passage that includes multiple flow paths. For example, consider a primary flow path (arrow 1940, FIG. 16) for coolant that flows around an end of a pin or ends of pins that creates a main flow path to remove heat energy from an outer surface of a stator of an electric motor via a bore wall of a housing where, for example, a printed circuit board (PCB) and/or other electronics may be located between a portion of a coolant passage and an outer wall.

As an example, a secondary flow path (arrow 1950, FIG. 16) for coolant may be formed at least in part by a pin or pins, for example, along a flow portion or flow portions of the pin or pins. As explained, a pin may be a variable external diameter pin where the diameter of the pin may diminish along an axial length of the pin in a manner that causes a clearance (e.g., or clearances) between an outer surface of the pin and a wall of a housing (e.g., or walls of a housing). As an example, a pin may be sized and/or shaped to regulate an amount of secondary coolant flow along a secondary flow path, which may provide for reducing potential formation of one or more low flow zones (e.g., one or more dead zones) in which coolant may be ineffective as removal of heat energy (e.g., consider one or more stagnant coolant regions).

As an example, a pin may be made of one or more types of materials. As an example, a pin may be made of a material and/or in a manner that may provide for improved heat transfer. For example, consider a metallic pin with a relatively high heat transfer coefficient and thermal conductivity and/or a metallic pin with an increased surface area (e.g., consider a fin shaped pin, etc.).

As an example, where an electric compressor assembly includes multiple pins, the pins may be identical and suitable for insertion in each of a number of pin locations. As an example, a pin may be axisymmetric such that it may be inserted in any rotational position while still providing for intended alteration of fluid flow in a coolant passage. As an example, a pin may be symmetric from end to end such that either end may be inserted into a coolant passage. As an example, a pin may include a cross-sectional shape that may be other than circular such that rotational position of the pin may provide for adjusting one or more clearances.

Figure 20:
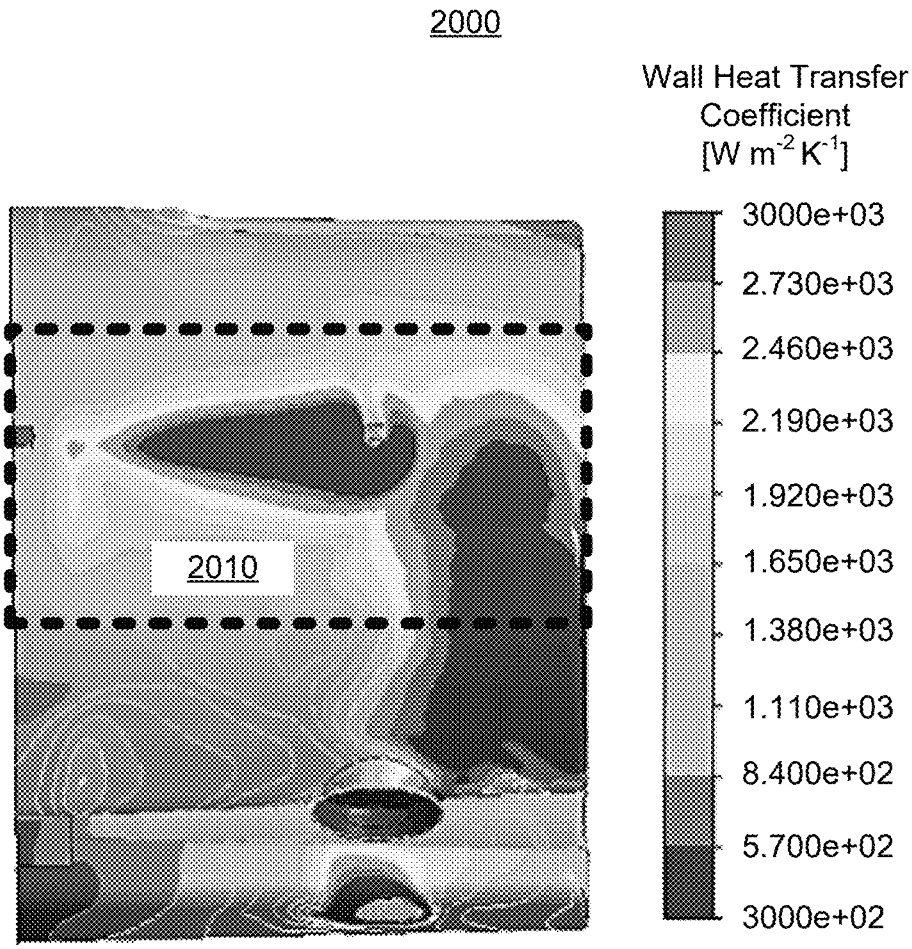
FIG. 20 is an example of a contour plot of wall heat transfer coefficient.

FIG. 20 shows an example of a contour plot 2000 that includes various contours indicative of wall heat transfer coefficient for a housing with a coolant passage that includes three pins, each with a conical shape. In the plot 2000, a dashed line indicates a region 2010 of the housing that is adjacent to circuitry such as, for example, the circuitry 920 of the electric compressor housing 300 (e.g., or 1300). As shown, the region 2010 within the dashed line may be free of dead zones such that heat transfer is improved (e.g., for circuitry cooling, etc.). As an example, the region 2010 may correspond to an area that may include one or more MOSFET circuits, etc. As an example, appropriate thermal management (e.g., temperature control via cooling, etc.) of circuitry may provide for increased longevity of an electric compressor assembly.

As an example, a compressor assembly may include: an electric motor that includes a stator and a rotor, where the stator defines an axis and where the rotor includes a shaft substantially centered along the axis; a compressor wheel coupled to the shaft; a back disk disposed between the compressor wheel and the electric motor; a housing that includes a bore wall that seats the stator and an outer wall that includes a coolant inlet and a coolant outlet in fluid communication with a coolant passage defined by and at least in part between the bore wall and the outer wall; and at least one pin disposed at least in part in the coolant passage, substantially parallel to the axis, that diminishes flow area within the coolant passage to define multiple flow paths within the coolant passage.

As an example, at least one pin may include a polymeric material. As an example, where multiple pins are present and disposed at least in part in a coolant passage, one or more of the multiple pins may include a polymeric material. As an example, one or more pins may be made of a polymeric material such as, for example, PEEK. A polymeric material may be substantially electrically non-conductive and relatively immune to eddy current formation. When an electrically conductive material (e.g., metallic, carbon, etc.) is exposed to a changing magnetic field, an induced eddy current may appear. Eddy currents may give rise to heating of an electrically conductive material (e.g., via resistance), which may be transferred to a coolant, raising its energy content (e.g., temperature). Operation of an electric motor can result in a changing magnetic field. An electric compressor assembly may include a housing and/or one or more other components that may shield and diminish strength of a changing magnetic field. A metallic housing may include one or more walls that provide for diminishing strength of a changing magnetic field as generated by operation of an electric motor (e.g., as housed by the metallic housing).

As an example, at least one pin may include a pin that has an axial length that is less than an axial length of a coolant passage. In such an example, the coolant passage can include a primary flow path between an end of opposing ends of the pin and an end of the coolant passage and a secondary flow path between the opposing ends of the pin. In such an example, coolant may flow in a gap at an end of the pin and coolant may flow in a clearance between a surface of the pin and a surface of a wall that defines, at least in part, the coolant passage.

As an example, a compressor assembly may include two pins. As an example, a compressor assembly may include three pins. As an example, a compressor assembly may include two or more pins. As an example, a compressor assembly may include three or more pins. As an example, a compressor assembly may include exactly two pins. As an example, a compressor assembly may include exactly three pins.

As an example, a compressor assembly may include electric motor circuitry operatively coupled to a stator or at least a stator.

As an example, compressor assembly may include a coolant passage where the coolant passage includes multiple flow paths that may help to reduce dead zones within the coolant passage. As explained, a coolant passage may be configured with one or more components disposed at least in part therein where one or more of the one or more components act to reduce the presence of a dead zone or dead zones in a region adjacent to a circuitry recess that may provide for receipt of electric motor control circuitry, which may include one or more switching circuits (e.g., consider one or more MOSFET circuits, etc.).

As an example, a compressor assembly may include a coolant passage where the coolant passage includes an annular span of at least 215 degrees about the axis. In such an example, the annular span may be measured as angular span or arc distance or arc angle between an inlet opening and an outlet opening for coolant.

As an example, a coolant passage may include an axial notch. For example, the bridge 784 of the example of FIG. 7 may provide for formation of an axial notch in the coolant passage 760. For example, the coolant passage 760 may include a flow region that is defined by a gap between an end of the bridge 784 and a surface of a back disk (see, e.g., the back disk 600) where the coolant passage 760 itself is notched by the presence of the bridge 784 where the bridge 784 extends an axial distance to form an axial notch in the coolant passage 760.

As explained, a compressor assembly may include a coolant passage as a three-dimensional space, which may be defined by housing walls, for example, of a cast housing. As explained, an axial notch may be defined as part of a coolant passage by an axially extending bridge between a bore wall and an outer wall of a housing. As an example, a bridge may be referred to as a rib where the rib spans a distance between two walls (e.g., a bore wall and an outer wall). Where a housing is a cast housing, a bridge or bridges may be integrally cast within the housing. As an example, a cast housing may be cast using a mold where material flows to fill the mold to form the cast housing with spaces therein such as, for example, a coolant passage space.

As an example, an axial notch of a coolant passage, as may be defined by a bridge, may be greater than 50 percent of an axial length of the coolant passage and less than 90 percent of the axial length of the coolant passage. For example, an axial notch may provide for defining a flow region that is approximately 10 percent to approximately 50 percent of an axial length of a coolant passage. As an example, multiple flow paths of a coolant passage may converge between an end of an axial notch and an end of the coolant passage.

As an example, multiple flow paths of a coolant passage may include a primary flow path defined by an undiminished flow area. In such an example, the primary flow path may coincide at least in part with a circuitry region for electric motor circuitry.

As explained, a compressor assembly that includes a coolant passage may provide for cooling of an electric motor and may provide for cooling of electric motor circuitry, where, for example, the electric motor may be to one side of the coolant passage and the electric motor circuitry may be to another side of the coolant passage. For example, consider a substantially annular coolant passage that may be defined by an inner radius and an outer radius where an electric motor is proximate to the inner radius and where electric motor circuitry is proximate to the outer radius. In such an example, heat energy may flow to coolant in the coolant passage from a larger radius inwardly and from a smaller radius outward; noting that a coolant passage may include one or more substantially flat or planar portions, which may help to increase surface area for heat transfer with respect to electronics. For example, an electric motor stator may be substantially cylindrical while electronics may be substantially planar as may be supplied on a board (e.g., a printed circuit board (PCB)). In such an example, one wall of a housing may be cylindrical while another wall of the housing may be substantially cylindrical in that it includes a substantially flat or planar portion that coincides with a recess for receipt of circuitry, as may be provided using a board (e.g., a PCB).

As an example, effective operation of a compressor assembly may be facilitated by use of a cooling scheme that provides for cooling of an electric motor and its associated circuitry where such circuitry may be located a distance from the electric motor that may be defined at least in part by a distance between two walls of a housing that define a coolant passage.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions. CLAIMS

What is claimed is:

1. A compressor assembly comprising:

an electric motor that comprises a stator and a rotor, wherein the stator defines an axis and wherein the rotor comprises a shaft substantially centered along the axis;

a compressor wheel coupled to the shaft;

a back disk disposed between the compressor wheel and the electric motor;

a housing that comprises a bore wall that seats the stator and an outer wall that comprises a coolant inlet and a coolant outlet in fluid communication with a coolant passage defined by and at least in part between the bore wall and the outer wall;

at least one pin disposed at least in part in the coolant passage, substantially parallel to the axis, that diminishes flow area within the coolant passage to define multiple flow paths within the coolant passage wherein the at least one pin comprises a pin that has an axial length that is less than an axial length of the coolant passage; and wherein the coolant passage comprises a primary flow path between an end of opposing ends of the pin and an end of the coolant passage and a secondary flow path between the opposing ends of the pin.

2. The compressor assembly of claim 1, wherein the at least one pin comprises a polymeric material.

3. The compressor assembly of claim 1, wherein the at least one pin comprises two pins.

4. The compressor assembly of claim 1, wherein the at least one pin comprises three pins.

5. The compressor assembly of claim 1, comprising electric motor circuitry operatively coupled to the stator.

6. The compressor assembly of claim 1, wherein the multiple flow paths reduce dead zones within the coolant passage.

7. The compressor assembly of claim 1, wherein the coolant passage comprises an annular span of at least 215 degrees about the axis.

8. The compressor assembly of claim 7, wherein the coolant passage comprises an axial notch.

9. The compressor assembly of claim 8, wherein the axial notch is defined by an axially extending bridge between the bore wall and the outer wall.

10. The compressor assembly of claim 8, wherein the axial notch is greater than 50 percent of an axial length of the coolant passage and less than 90 percent of the axial length of the coolant passage.

11. The compressor assembly of claim 8, wherein the multiple flow paths converge between an end of the axial notch and an end of the coolant passage.

12. The compressor assembly of claim 1, wherein the multiple flow paths comprise a primary flow path defined by an undiminished flow area.

13. The compressor assembly of claim 12, wherein the primary flow path coincides at least in part with a circuitry region for electric motor circuitry.

* * * * *